3,011,359
OPERATOR FOR A ROTATABLE STEM VALVE
OR THE LIKE
James N. Morrell, Piney Point, Tex., assignor to E-I-M Company, Incorporated, Missouri City, Tex., a corporation of Texas
Filed Mar. 6, 1959, Ser. No. 797,731
5 Claims. (Cl. 74—509)

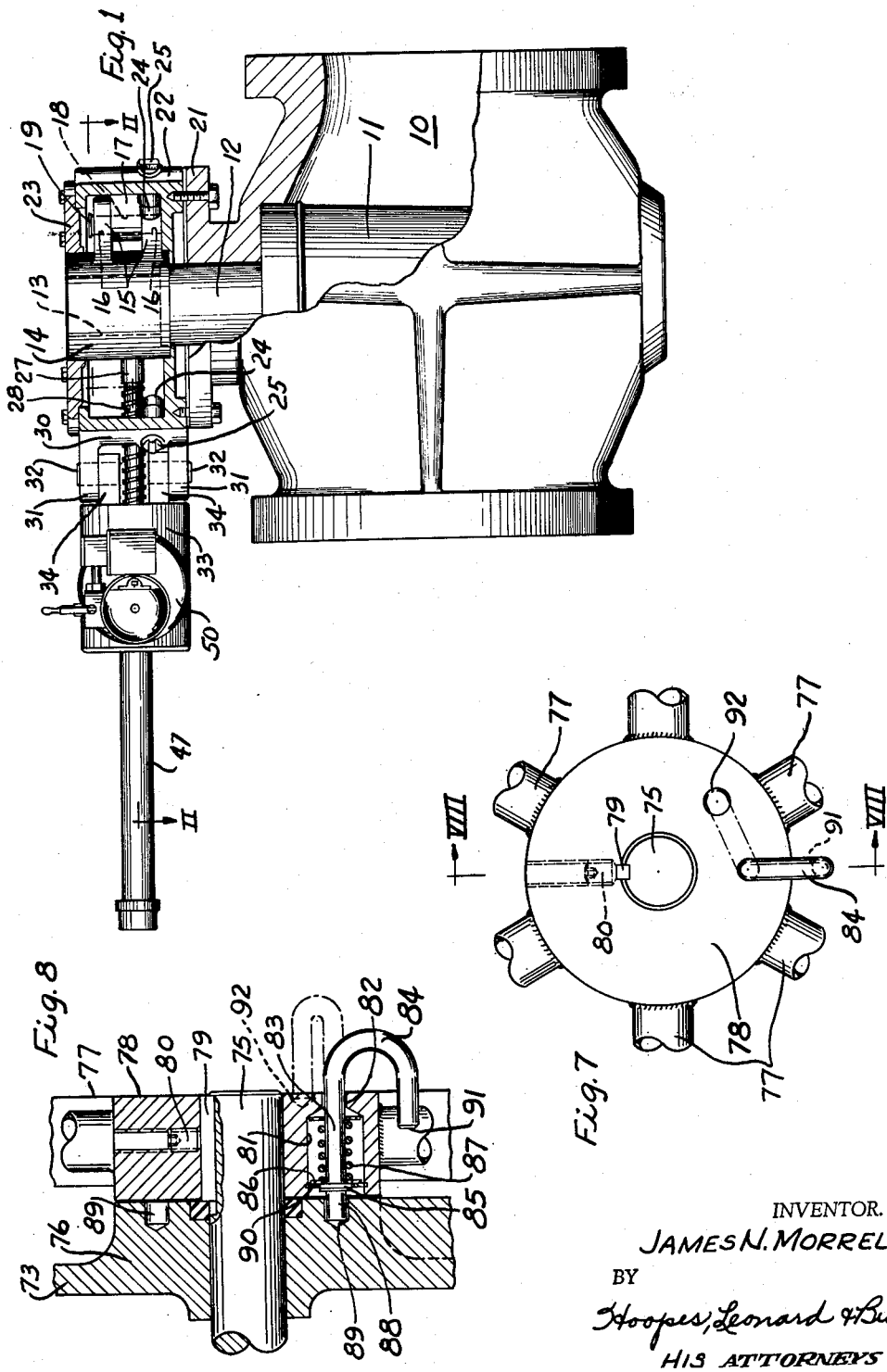

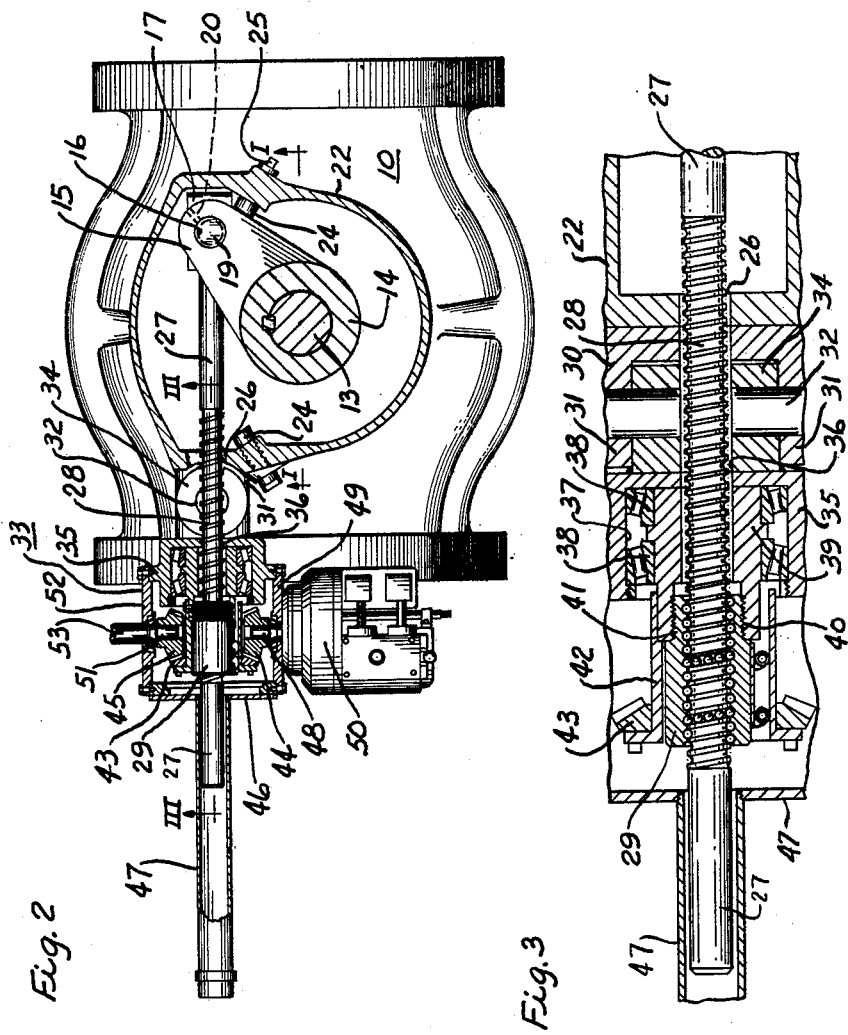

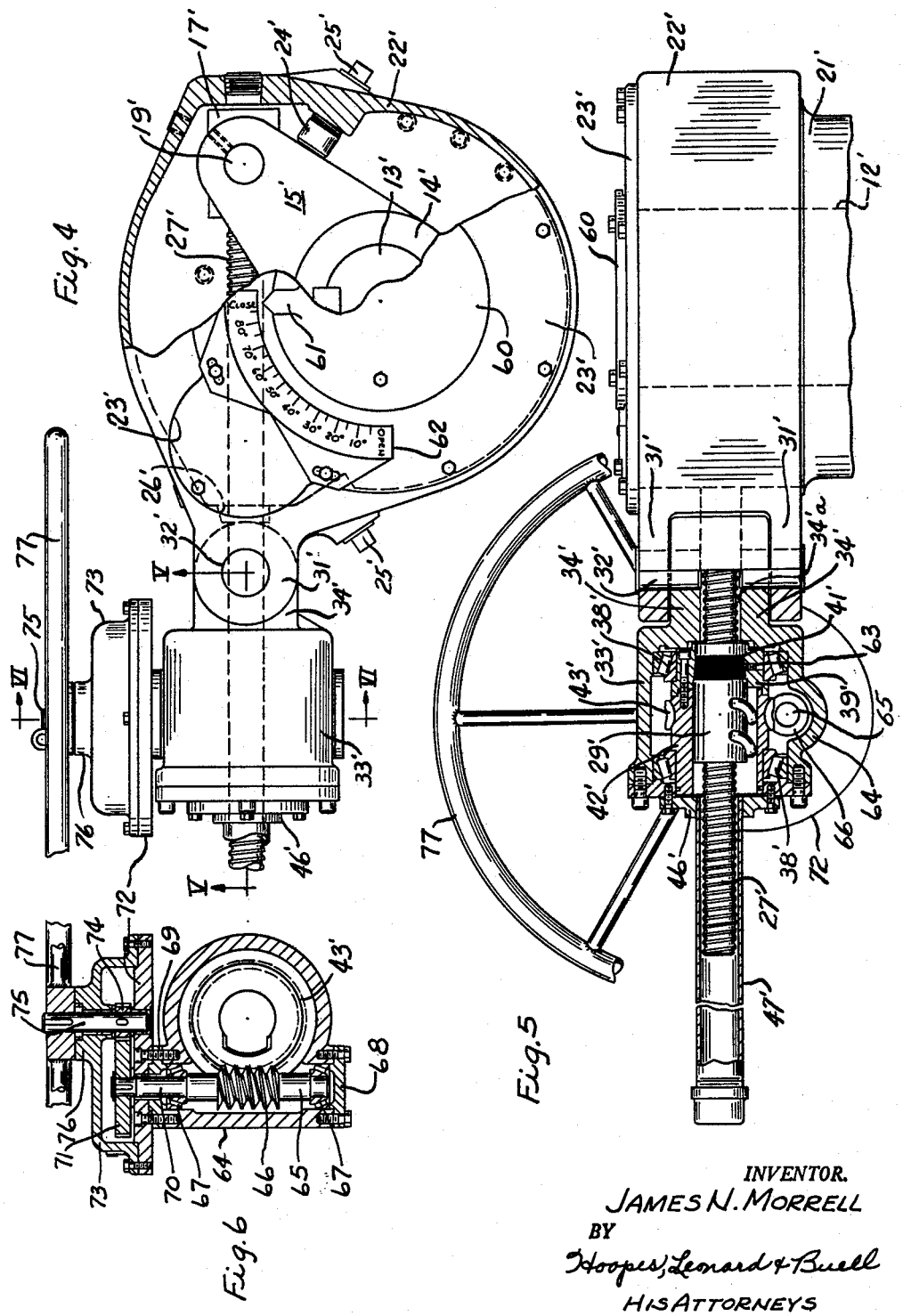

This invention relates to an operator, which may be powered or manual, for a rotatable stem valve or the like. More particularly, this invention pertains to a mechanism for turning a rotary member through an arc by substantially frictionless means which preferably are swingably and closely connected to the device operated.

The instant invention markedly reduces torque force requirements formerly found necessary to operate, for example, equipment such as large full opening plug valves, butterfly valves and other rotatable stem equipment. Not only do operators of this invention achieve high efficiency using ball screw and nut elements but, in addition, relatively high forces and relatively close couplings are achievable in compact equipment swingably mountable on the device being operated. Moreover, embodiments of this invention can be utilized with existing valve controls for remote or local operation and with or without adjunct handwheels for manual operation. This invention provides means further whereby the operator may be made irreversible and self-locking to prevent any turning of the device operated as a result of the force of the controlled material such as the fluid in a fluid carrying line. Still further, rotary valve equipment employing an operator construction of this invention can be opened or closed as desired more rapidly and without cumbersome gearing, cam devices and other attachments heretofore used.

Other objects, features and advantages of this invention will be apparent from the following description and the accompanying drawings, which are illustrative only, in which FIGURE 1 is a view in elevation of an operator embodiment of this invention partly in section along line I—I of FIGURE 2 applied to a rotary plug valve, a portion of which is shown broken away;

FIGURE 2 is a plan view of the embodiment shown in FIGURE 1 partly in section taken along line II—II of FIGURE 1;

FIGURE 3 is a detail view taken along line III—III of FIGURE 2;

FIGURE 4 is a top view of a further operator embodiment of this invention with a portion of the mechanism shown partly broken away in section;

FIGURE 5 is a view of such further embodiment partly in section taken along line V—V of FIGURE 4;

FIGURE 6 is a view in section taken along line VI—VI of FIGURE 4;

FIGURE 7 is a detailed view of the handwheel subassembly shown in such further embodiment illustrating a latch mechanism applied thereto; and FIGURE 8 is a view in section taken along line VIII—VIII of FIGURE 7.

Referring to FIGURES 1 to 3 of the drawings, there is shown therein a valve 10 having a rotatable plug 11 therein to open and close the valve passage to the extent desired. Plug 11 is of the type which moves through 90° more or less in going from fully opened to fully closed positions, or vice versa. A rotatable stem 12 is secured to plug 11 and terminates in an upper end 13. A sleeve 14 is keyed to end 13 and provided with upper and lower radial arms 15 which together form a crank having a crank pin opening 16 in each of the arms adjacent to the outer end thereof. A pivot block 17 fits between arms 15 and is also provided with a vertical hole 18 in alignment with the holes 16 to receive a crank pin 19 passing therethrough to pivotally link the crank and block. A set screw 20 in upper arm 15 may be used to lock pin 19 in place with block 17 remaining free to pivot thereabout as it moves the crank to, in turn, rotate plug 11 to its selected position.

Valve 10 is provided with a bonnet flange 21 to which a crank housing 22 is affixed. The top of the housing is closed by an annular cover 23 which may have indicating means thereon to show the angular position of the plug 11 at the time of any desired observation.

Housing 22 is engaged by threaded abutments 24 on each side thereof to act as stops at the extreme limits of swing of crank 15. Heads 25 on stops 24 enable them to be turned to adjust each abutment to position it in its precisely desired location. Housing 22 is provided with an opening 26 on the side thereof through which a ball threaded rod 27 extends with sufficient clearance so that in each of the possible angular positions of rod 27, it does not rub against housing 22. The end of rod 27 in housing 22 is rigidly connected to block 17 and it may be fully intergal therewith. Ball threads 28 on rod 27 may be of the so-called "Saginaw" screw design to cooperate with a ball nut 29 having ball bearings therein to engage threads 28 and move rod 27 axially relative to nut 29 as it is rotated in one direction or the other, as selected. When rod 27 is pushed to the right as viewed in FIGURE 2, it will rotate stem 12 and plug 11 in valve 10 until the extreme position illustrated is reached. On the other hand, when rod 27 is pulled to the left, it will pull crank 15 through the desired angular distance in the opposite direction until the rotation of nut 29 is stopped. Hence, movements of rod 27 in one direction or the other will position valve 10 in the correspondingly desired position until the next selected movement of such rod.

Housing 22 is provided with a mounting bracket 30 with upper and lower ears 31 drilled for the reception respectively of retainer pivot pins 32. A retainer casing 33 is provided to hold nut 29 in rotatable relation only to such casing. Casing 33 is provided with a swing bracket having upper and lower swing bracket ears 34 which fit, in the illustrated embodiment, between ears 31. Upper and lower pins 32 engage registering holes respectively in the upper and lower sets of ears 31 and 34 to enable casing 33 and parts carried thereby to swing or pivot about the axis of the pins 32 in the course of operation. A wall 35 in casing 33 nearest to the retainer pivot is provided with an opening 36 through which rod 27 extends and has a bearing well 37 for roller thrust bearings 38 for a holder 39 to enable it to move in rotation but not in translation relative to casing 33.

Holder 39 is counterbored and threaded at 40 to engage and secure the nearer threaded end 41 of nut 29. A drive sleeve 42 surrounds nut 29 and is fixed to holder 39 also. Drive sleeve 42 is fastened to a ring gear 43 which, as shown, is a bevel gear which surrounds nut 29 and is in engagement with bevel gear pinions 44 and 45 on opposite sides thereof. As will be understood, other forms of gearing and toothed members may be used to provide a positive mechanical connection for the rotation of nut 29 to open or close a valve or the like associated therewith. A cover plate 46 is provided on the farther side of casing 33 and supports a protector tube 47 in which the outer end of rod 27 moves in the course of operation.

Pinion 44 is keyed to an output shaft 48 extending into casing 33 through a bushing in a bushing cover 49 fastened to casing 33. Output shaft 48 is preferably either an extension of or the output shaft itself, as shown, of a valve control 50 fastened to cover 49 by bolts or otherwise. Pinion 45 may be keyed to a shaft 51 extending through a bushing in a bushing cover 52 fastened to casing 33. The pinion shaft 51 may be a reduced end of a hand wheel shaft 53 to which a large diameter hand wheel might be affixed for manual operation of the illustrated embodiment of this invention.

Valve control 50 is reversible and operable manually or remotely as desired. It may be made in accordance with the construction shown in United States Patent No. 2,743,897, for example, with power supplied by the available gas pressure in a gas line in which valve 10 may be employed; or other valve controls may be utilized including an electrical powered valve control such as that illustrated in my copending application for United States Letters Patent Serial No. 513,763 filed June 7, 1955, now Patent No. 2,916,947.

The illustrated embodiment of FIGURES 1 to 3 shows an operator normally utilized under conditions in which material flowing through valve 10 would not exert sufficient force to change the position of plug 11 to which it had been turned by such operator. However, that embodiment may be made self-locking by connecting a valve control such as one illustrated in application Serial No. 513,763 with a locking ratio worm and worm wheel output to pinion shaft 48.

In the further operator embodiment illustrated in FIGURES 4 to 6, inclusive, means are provided in the operator itself to lock a rotatable stem of a butterfly valve or other equipment in the position to which it is turned to resist any resetting pressure to which such valve is exposed. In such embodiment of FIGURES 4 to 6, parts corresponding generally in construction and functioning to those in FIGURES 1 to 3 are provided with the same reference numerals with the addition of a prime accent thereto. Thus, bonnet 21' supports a crank housing 22' into which a rotatable stem end 13' extends for rigid connection to a crank sleeve 14'. An indicator plate 60 having a pointer 61 is bolted to the top of sleeve 14' and is rotatable in the central opening of cover plate 23'. Pointer 61 cooperates with a quadrant scale 62 fastened to cover 23' to provide a visible signal as to the position of stem 12' and thereby of the valve or other mechanism controlled by the operator embodiment shown.

Ball screw rod 27' is rigidly connected to pivot block 17' and extends through opening 26' in housing 22' thence passing into an opening 34'a of suitable cross section in the single retainer bracket 34' swingably held by pins 32' and the respective bracket ears 31' before passing into the interior of retainer casing 33'.

Casing 33' retains ball nut 29' so that it may be rotated but cannot move axially in translation relative to casing 33'. Thus, threaded inner end 41' of nut 29' is threadably engaged by a holder 39' to which it is further secured by a set screw 63. Holder 39' in turn is rigidly bolted to a drive sleeve 42' surrounding nut 39', the sleeve 42' having a ring gear member 43' thereon in the form of a worm wheel around the periphery thereof. Laterally extending shoulders on the members 39' and 42' are engaged by roller thrust bearings 38' to prevent axial movement while permitting rotational movement of members 39' and 42' and thereby of nut 29'.

Casing 33' has a bay portion 64 in which a worm shaft 65 extends with a worm 66 in fixed relation thereon. Preferably, worm 66 and gear 43' are irreversible, that is, self-locking so that nut 29' will only rotate when worm 66 is rotated. Roller thrust bearings 67 engage shoulder portions on shaft 65 to enable it to be rotated in either direction and thereby rotate ring gear 43' with which it is in engagement without axial movement of shaft 65 being possible.

Bay 64 is provided with a cover plate 68 at one end and an annular cover plate 69 at the other end through which a reduced portion 70 of shaft 65 extends for keyed engagement with a driven gear 71. A base plate 72 is attached to casing 33' and cover 69 by bolting thereto. A box enclosure 73 in turn is bolted to base 72 to enclose gear 71 and a drive gear 74 therefor fixed to a wheel shaft 75 suitably supported in the members 72 and 73. Wheel shaft 75 extends through a hub 76 to the outside of cover 73 where it is attached to a preferably large diameter handwheel 77 for manual rotation in either direction to swing crank 15' to any selected position between its operable limits.

Provision may also be made so that handwheel 77 is guarded against inadvertent disturbance. Thus, handwheel 77 is provided with a hub 78 having a key 79 and a set screw 80 to secure handwheel 77 to shaft 75. Hub 78 is counterbored at 81 with a smaller opening 82 at the outer end thereof through which a shank 83 of a latch hook 84 passes. Shank 83 has a flange 85 near the inner end thereof and washers 86 act as heads for a biasing spring 87 normally urging inner end 88 of latch 84 toward one or more of a series of circumferentially arranged drilled holes 89 in cover hub 76. A ring retainer 90 keeps the parts in their assembled relation. When latch 84 is in the position shown in full lines in FIGURES 7 and 8, handwheel 77 is not subject to inadvertent turning thereby disturbing the setting of the rotatable stem 12' controlled by handwheel 77. However, when it is desired to reset the position of that stem, latch 84 is lifted against the pressure of spring 87 and end 91 thereof is swung over and into a keeper recess 92 in hub 78. In that condition, latch 84 is in the position shown in chain outline in FIGURES 7 and 8 and its inner end 88 is out of and held away from any of the openings 89 so that wheel 77 can be turned to the extent and in the direction desired. Upon reaching a newly selected position for valve stem 12', latch 84 is returned to its latched position in cooperation with the nearest opening 89 and its end 91 between the adjoining spokes of the handwheel.

It will be clear also that the further embodiment of FIGURES 4 to 6 may be made into a power operator for local or remote control by coupling any suitable power valve control, including those referred to hereinabove, to worm shaft 65. Various changes may be made in the gearing, parts and other details of the illustrated embodiments and other embodiments provided without departing from the spirit of this invention or the scope of the appended claims.

I claim:

1. An operator for a valve or the like having a rotatable stem, apparatus comprising, in combination, a crank connected at an angle to said stem to rotate it to operate said valve or the like, a block pivotally connected to said crank, a ball threaded rod connected to said block, a ball nut in engagement with said rod in spaced relation to said block, a retainer for said nut pivotally mounted on the body of said valve or the like for movement in an arc, means to hold said nut in a rotatable manner only in said retainer irrespective of the arcuate position of said retainer, means mounted on said retainer and movable therewith to which force is applied to rotate said nut to move said rod axially a corresponding distance and in a corresponding direction to turn said crank and operate said valve or the like, and means to hold said nut against movement by any pressure thereagainst on the part of said rod.

2. An operator for a valve or the like having a rotatable stem, apparatus comprising, in combination, a crank substantially at right angles to the axis of said stem to rotate it to open or close said valve or the like, a block pivotally connected to said crank, a ball threaded rod connected to said block, a ball nut in engagement with said rod in spaced relation to said block, an arcuately movable retainer for said nut pivotally connected to said valve or the like, said pivotal connection and nut having their respective axes intersecting in every arcuate position of said retainer, means to hold said nut in a rotatable manner and against any substantial axial movement thereof relative to said retainer, and means connected to and movable with said retainer to which force is applied to rotate said nut and move said rod axially a corresponding distance and in a corresponding direction to turn said crank and operate said valve or the like.

3. In an operator for a valve or the like having a rotatable stem, apparatus comprising, in combination, a member operatively connected to said stem to rotate it to operate said valve or the like, a threaded rod pivotally connected to said member, a nut in engagement with said rod, a retainer for said nut pivotally mounted on said valve or the like, said pivotal mounting having spaced pivot portions between which said rod extends, the axis of said rod intersecting the rotation axis of said pivot portions in every position of said rod, means to hold said nut in a rotatable manner and against axial movement thereof relative to said retainer, and a prime mover movable with said retainer to apply force to said nut to rotate it and move said rod axially a corresponding distance and in a corresponding direction to turn said stem through a selected arc.

4. An operator for a valve or the like with a rotatable stem, apparatus comprising, in combination, a crank adapted to be rigidly connected to said stem to turn the same in accordance with arcuate movements of said crank about the axis of said stem, a ball threaded rod pivotally connected to said crank in radially spaced relation to the axis of said stem, a ball nut in engagement with said rod, a retainer in which said nut is mounted for rotational movement only relative thereto, a ring gear surrounding said nut in fixed relation thereto, toothed means in engagement with said ring gear for movement of said ring gear about the axis of said nut in accordance with rotary movements of said toothed means, a mounting bracket on said valve or the like, a pivot bracket on said retainer, a retainer pivot pin connecting said respective brackets for arcuate movement of said retainer relative to said valve or the like, a powered valve control mounted upon said retainer, a handwheel mounting means mounted upon said retainer, said valve control and said wheel mounting means being respectively connected to said toothed means, and means to prevent said ring gear from rotating said toothed means.

5. In an operator for a valve or the like having a rotatable stem, apparatus comprising, in combination, a crank member connected at an angle to said stem to rotate it to operate said valve or the like, a block pivotally connected to said crank member, a ball threaded rod connected to said block, a ball nut in engagement with said rod in spaced radial relation to said block, a retainer for said nut pivotally mounted on said valve or the like, means to hold said nut for rotation and against translation relative to said retainer, a handwheel mounted on said retainer to rotate said nut and move said rod axially a corresponding distance and in a corresponding direction to turn said crank member and operate said valve or the like, and latch means to hold said handwheel against inadvertent movement.

References Cited in the file of this patent

UNITED STATES PATENTS

| | | |
|---|---|---|
| 2,221,101 | Lefkowitz | Nov. 12, 1940 |
| 2,454,548 | Brinkert | Nov. 23, 1948 |

FOREIGN PATENTS

| | | |
|---|---|---|
| 443,756 | France | July 22, 1912 |